April 7, 1942.  V. B. BAGNALL  2,278,633

TEMPERATURE CONTROL APPARATUS

Filed Aug. 15, 1940

INVENTOR
V. B. Bagnall
BY Jefferson Ehrlich
ATTORNEY

Patented Apr. 7, 1942

2,278,633

UNITED STATES PATENT OFFICE 2,278,633

TEMPERATURE CONTROL APPARATUS

Vernon Bernard Bagnall, West Orange, N. J., assignor to American Telephone and Telegraph Company, a corporation of New York Application August 15, 1940, Serial No. 352,724

5 Claims. (Cl. 219—20)

This application relates to Wheatstone bridge circuits as well as to temperature control apparatus. More particularly this invention relates to Wheatstone bridge circuits for the control of temperature in ovens or the like.

In the operation of high frequency oscillator circuits, especially those employing piezo-electric crystals for the control of the frequency of the generated oscillations, a temperature-controlled oven is often employed to maintain the temperature of the piezo-electric crystal element substantially constant. The temperature-controlled mechanism usually employed in such apparatus is in the form of a thermostat, and the temperature within the oven, responding to the action of the thermostat, undergoes a cyclical variation between upper and lower limits. Such apparatus necessarily undergoes substantial changes of temperature within the two limits of the thermostat with consequent appreciable changes in the frequency of the oscillations of the circuit controlled by the crystal.

According to the present invention a novel form of Wheatstone bridge circuit is enclosed within a box or oven together with a heating element, and the box or oven is accordingly maintained at a more uniform temperature. The box or oven may enclose a piezo-electric device and parts of electrical circuits which must respond to temperature changes within the oven. The arrangement will operate continuously with temperature variations reduced to a small fraction of the variations experienced with present methods of temperature control.

Figure 1:
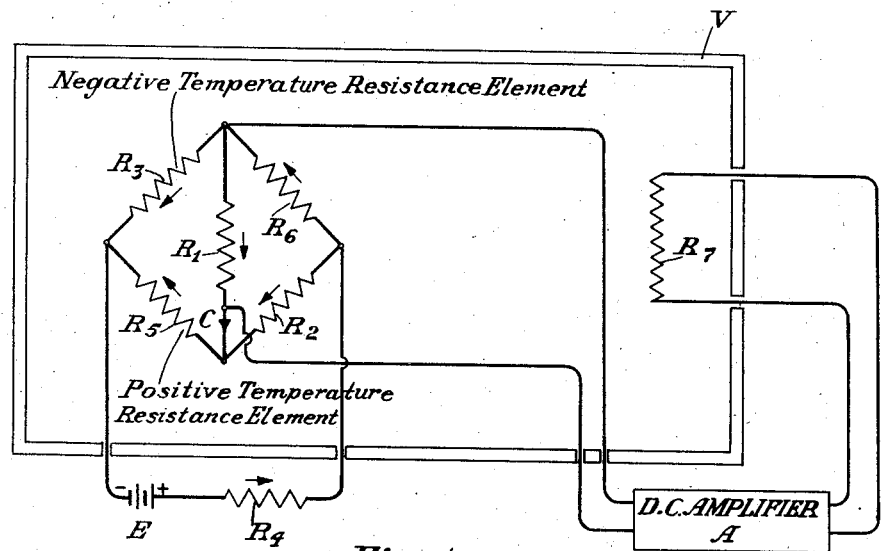
Figure 2:
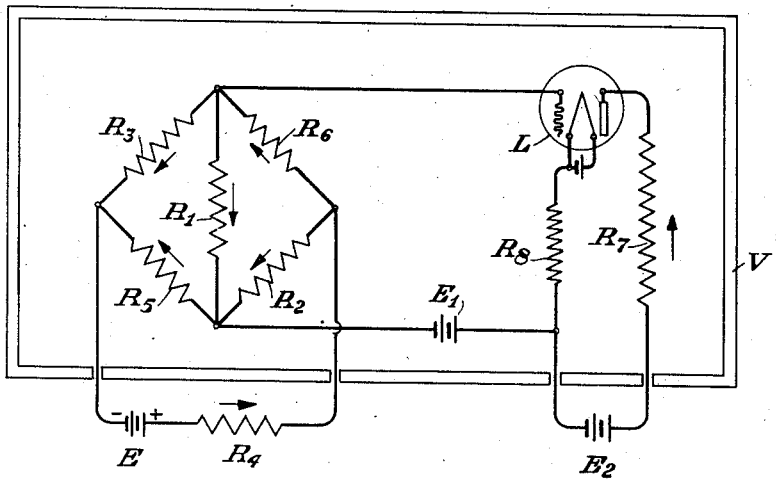

This invention will be better understood from the detailed description hereinafter following when read in connection with the accompanying drawing in which Figure 1 represents one embodiment of the invention showing a novel form of Wheatstone bridge arrangement for practicing the invention, and Fig. 2 represents a modification of the arrangement illustrated in Fig. 1.

Referring to Fig. 1 of the drawing, the reference character V designates a box or oven which is to be maintained at a suitable temperature such as about 110° F., a temperature which is somewhat higher than the medium usually surrounding the box or oven V. The heating element within the oven V is designated $R_7$, and this heating element is to be supplied with current whenever required to raise the temperature within the oven to its required value. The amount of current supplied to the heating element $R_7$ is to be increased as the temperature within the oven V drops further and further below the required value, while at the same time current supplied to element $R_7$ is to be reduced as the temperature within the enclosure approaches the predetermined value.

A Wheatstone bridge comprising four arms, $R_2$, $R_3$, $R_5$ and $R_6$, is also enclosed within the oven V as shown. Two of these arms, $R_3$ and $R_5$, may be thermistors which have opposite non-linear resistance-temperature characteristics, the resistor $R_3$, for example, being of a negative resistance-temperature characteristic, and the resistance $R_5$ of a positive resistance-temperature characteristic. Such resistors are well known in the art. The two remaining arms of the bridge, i. e., $R_2$ and $R_6$, may be resistors which have zero or negligible temperature coefficients of resistance.

It is important that the resistance-temperature coefficient of the two variators be opposite. It should also be pointed out that only one variator could be used, the second being replaced with a resistance.

A resistor $R_1$ and a rectifier C are connected in series with each other as one of the diagonals of the bridge which is also enclosed within the oven V. A battery E or other source of direct current potential and a resistor $R_4$, which may be a current-limiting resistor, are connected in series with each other as the other diagonal of the bridge. The elements forming the latter diagonal need not be enclosed within the oven V. The resistor $R_1$ is connected to the input circuit of an amplifier A, which may be a direct current amplifier, and the output circuit of the amplifier A may be connected to the heating element $R_7$ as shown.

The various arms of the bridge $R_2$, $R_3$, $R_5$ and $R_6$ are adjusted so that the bridge will be balanced at some predetermined temperature such as 110° F. At this temperature no current will flow through the resistor $R_1$ and rectifier C, and hence no current will be supplied by the amplifier A to the heating element $R_7$. Although no current flows through the heating element $R_7$ when the bridge is balanced, the battery E will continue to supply current through the resistor $R_4$ to the various arms of the bridge. The bridge is designed so that the heat supplied by these elements $R_7$, etc. when the bridge is balanced is not greater than the minimum heat required to maintain the oven at the desired temperature.

As the temperature within the oven V drops below 110° F. and continues to drop in temperature, more and more current will flow from the battery E through the resistor R4 and through the various arms of the bridge already referred to. In response to the drop in temperature, the arm $R_3$ will be increased in resistance and the arm $R_5$ decreased in resistance. Because of the proportions of the various resistances and the large temperature coefficients of resistance of arms $R_3$ and $R_5$, a substantial current will flow through the resistor $R_1$ and rectifier C. The potential across resistor $R_1$ will be impressed upon the amplifier A, and the amplifier A will supply a large current to the heating element $R_7$. Consequently the temperature within the oven V will rise. As the temperature within the oven approaches the required value, the potential across the resistor $R_1$ will drop off by corresponding amounts, and hence the current supplied to the heating element $R_7$ will be proportionately reduced. The bridge will become balanced when the required temperature is reached, and in that case no further current will flow through the heating element $R_7$.

Should the temperature surrounding the oven V rise above the predetermined value already referred to, as for example to 115° F., the arm $R_3$ will then decrease in resistance, and the arm $R_5$ increase in resistance, and hence there will be a tendency for current to flow through the resistor $R_1$ in a direction opposite to that indicated by the arrow. However, due to the employment of the rectifier C, no such oppositely directed current may flow through the resistor $R_1$, or in any event the reversed current will be reduced to a very low value. Consequently practically no voltage will be supplied to the amplifier A, and the heating element $R_7$ will not be supplied with appreciable heating current. The use of the rectifier C is important here because, while it does not interfere with the supply of current to the resistor $R_7$ to heat the oven and raise it to a predetermined temperature, it does block the flow of current to prevent the temperature from rising higher and higher above the predetermined value and reaching a "runaway" condition.

The heating element $R_7$ should preferably be placed in close proximity to the various arms of the bridge, and especially in close proximity to the arms $R_3$ and $R_5$. When so arranged the elements $R_3$, $R_5$ and $R_7$ will all be affected equally by temperature changes within the oven V without any time lag. The oven V may enclose a piezo-electric element (not shown) or other circuit elements, or, if desired, the oven V may be used for maintaining a constant temperature in chemical laboratories or the like.

The sensitivity of this arrangement is dependent in large part upon the non-linear characteristics of the elements $R_3$ and $R_5$. If these latter elements have large resistance-temperature coefficients, the response of the apparatus to changes of temperature will occur at a rapid rate.

The Wheatstone bridge arrangement of Fig. 1 may also be employed to supply current to the heating element $R_7$ continuously and in an amount which is in proportion to the temperature within the oven V. Such an arrangement is shown in Fig. 2. Here the resistor $R_1$ alone forms a diagonal of the bridge. The resistor $R_1$ is also connected into the grid circuit of a vacuum tube L along with a source of biasing potential $E_1$ and a resistor $R_6$. The heating element $R_7$ is connected into the plate circuit of the tube L along with a battery or other source of direct current potential designated $E_2$. The resistor $R_4$ is used to compensate for variations in tube L as well as in the potential of source $E_2$.

Current continuously flows from the battery $E_2$ through the resistor $R_7$ and over the anode-cathode path of the tube L, and this current is used to maintain a fixed and predetermined temperature within the oven V under normal conditions. Under such conditions the bridge will be balanced, and hence there will be no current through the resistor $R_1$. The only potential in the grid circuit will be that supplied by battery $E_1$, but this biasing potential will be just sufficient to maintain the current flow from the battery $E_2$ through the resistor $R_7$ at the desired value.

When the temperature within the oven V drops below the predetermined value, current will flow through the resistor $R_1$ in the direction indicated by the arrow by reason of the unbalance of the bridge, and the potential due to this current will be such as to oppose that introduced by the biasing battery $E_1$. Consequently a larger current will flow from battery $E_2$ through resistor $R_7$, and the increased current will raise the temperature within the oven V. The increased current will continue to flow until the temperature within the oven V reaches the predetermined value, in which case the bridge will again be balanced.

As the temperature within the oven V rises above the predetermined value, the bridge will become unbalanced in the opposite direction and hence current will actually flow through the resistor $R_1$ in a direction which is opposite to that indicated by the adjacent arrow. A potential will then be set up across the resistor $R_1$ which will aid that introduced by battery $E_1$, and hence a smaller current will flow from battery $E_2$ through the resistor $R_7$. As the amount of heat supplied to the oven V is thus reduced, the temperature within the oven V will fall off and this will continue until the required temperature is again reached. In this arrangement it is also important to have the resistors $R_3$, $R_5$ and $R_7$ in close proximity to each other.

In the arrangements of Figs. 1 and 2, two non-linear resistors $R_3$ and $R_5$ were employed in the bridge circuit, these having opposite temperature-resistance characteristics. This is an important feature of the invention. However, the invention may also be practiced with but one non-linear resistor, that is, either $R_3$ or $R_5$, the other non-linear resistor being replaced by a linear resistor such as $R_2$ or $R_6$.

While this arrangement has been shown and described in certain particular embodiments merely for the purpose of illustration, it will be understood that the general principles of this invention may be applied to other and widely varied organizations without departing from the spirit of the invention and the scope of the appended claims.

What is claimed is:

1. Temperature control apparatus for an enclosure comprising the combination of a Wheatstone bridge circuit, a heating element, means responsive to a drop in the temperature within said enclosure below a predetermined value to unbalance the bridge circuit and supply energy to the heating element at a rate proportional to the magnitude of the temperature drop, and means including a rectifier connected to but one diagonal of said bridge circuit to allow current to flow through said diagonal in but one direction to prevent energy from being supplied to said heating element to raise the temperature above the predetermined value.

2. Temperature control apparatus for an oven or the like, comprising the combination of a Wheatstone bridge circuit, a resistor, a rectifier connected in series with said resistor, said resistor and said rectifier being connected in but one diagonal of said bridge circuit to allow current to flow through said diagonal in but one direction, a heating element, and a source of power interconnecting said resistor and said heating element.

3. Temperature control apparatus for an enclosed space, comprising the combination of a Wheatstone bridge circuit, a resistor, a rectifier connected in series with said resistor in but one diagonal of said bridge circuit, said rectifier preventing current from flowing through said resistor and through the diagonal including the said resistor except in a predetermined direction, a heating element, and an amplifier interconnecting said resistor and said heating element.

4. Temperature control apparatus for an enclosed space, including a Wheatstone bridge circuit, a resistor, a one-way valve connected in series with said resistor in but one diagonal of said bridge circuit, means responsive to temperature changes beyond a predetermined value to unbalance the bridge, current flowing through said resistor and valve and through the diagonal of the bridge including said resistor only in one direction, and a heater controlled by the current flow through said resistor supplying heat at a rate proportional to the drop in temperature below said predetermined value.

5. Temperature control apparatus for an enclosed space, comprising a positive temperature-resistance element, a negative temperature-resistance element, a resistor, a one-way valve, said positive and negative elements forming two of the arms of a Wheatstone bridge circuit, said resistor and said valve being connected serially in but one diagonal of said bridge circuit so that current may flow through said diagonal in but one direction, a heater, and means responsive to a flow of current through said resistor for supplying energy to said heater.

VERNON BERNARD BAGNALL.